Patented Jan. 4, 1927.

1,613,569

UNITED STATES PATENT OFFICE.

EUGEN SAGI, OF BRATISLAVA, CZECHOSLOVAKIA, ASSIGNOR TO CHEMOSAN AKTIEN-GESELLSCHAFT, OF VIENNA, AUSTRIA, A CORPORATION OF AUSTRIA.

PROCESS FOR THE PRODUCTION OF SOLUTIONS OF MERCURY DERIVATIVES OF HYDROXY-SULPHO-BENZOIC ACIDS.

No Drawing. Application filed August 13, 1923, Serial No. 657,157, and in Austria August 17, 1922.

This invention relates to the production of solutions of mercury derivatives of hydroxy-sulpho-benzoic acids suitable for medicinal purposes.

It is known that mercury salicyl sulphonate can be obtained, which in contradistinction to the salicylate of mercury of the pharmacopœia (hydrargyrum salicylicum) is water soluble to a certain degree. For this purpose the sparingly soluble or insoluble compounds produced by boiling hydroxy-sulpho-benzoic acids, mercury oxide and water, are dissolved in an excess of alkalies, the desired more soluble alkali metal salt being thereupon obtained from said solution in a solid form by precipitation with alcohol or by evaporation. Inasmuch as in these known processes the starting material was free hydroxy-sulpho-benzoic acid, a considerable excess of mercury had to be used in this reaction.

At a later date it was proposed to mercurify the hydroxy-sulpho-benzoic acid and its homologues in acid solution, mercury compounds of the initial acids easily soluble in water being supposed to be obtained. However, in reality, the free carboxylic acids obtained in this manner in a crystalline form, when brought in contact with water yield extremely viscous emulsions. Even if alkalies or ammonia are added to the free acid only similar gel-like masses are produced, formation of salts taking place. The addition of sodium chloride solution to the free acid produces a very turbid solution from which after some time small white needles separate, which cause the whole mass to solidify. Thus by means of this process it is not possible to produce clear thinly liquid solutions, which would be suitable for injection purposes.

It has now been found, that the gel of the mercury compounds of hydroxy-sulpho-benzoic acids and their homologues which are produced when carrying out the mercurification in the presence of an excess of the respective free acids, is capable of undergoing after accurate neutralization the colloid-chemical alteration called "dissolvation", that is to say it can be transformed by the addition of small amounts of neutral salts into true solutions which show stability for an unlimited time. The acids produced by mercurification in acid solution have the tendency of gelatinizing. By this gelatinization the liquid sets to gels which after careful neutralization with alkalies, upon dissolvation by means of neutral salts, instantaneously yield thinly liquid true solutions, a direct transition of the gel into the molecularly dispersed solution being effected, without a phase of stable colloidal dispersion being observed. No doubt molecularly dispersed truly soluble complex salts are produced. For producing the above described effect numerous neutral salts are suitable, thus for example, the chlorides, bromides, iodides, and rhodanides of the alkali metals and of ammonium. The alkaline earth metal salts act less strongly, as do also the phosphates and acetates. The nitrates, sulphates and chlorates appear to have no effect. The Hofmeister series of ions is also characteristic for this complex salt formation. In this manner very pure solutions are obtained, the viscosity of which approximates that of water, and which show a considerably higher content in mercury, than any aqueous solutions of the mercury derivatives in question, which could be produced up to the present.

It is immaterial, whether the neutral salts are added prior to or after neutralization of the free acids or whether they are added only on concentrating the salt solution. On the other hand, however, it is essential to avoid a separation of the alkali metal salts on evaporation, because they appear to be transformed into mercury compounds incapable of undergoing dissolvation. The present process yields solutions with a mercury content of about 4 to 5 grams (as metal), which even on very strong concentration do not precipitate mercury-containing compounds, so that by further concentration, it is easily possible to obtain solutions containing 6% and more of organically combined mercury (as metal) which nevertheless remain permanently clear. If, however, the neutralized solution is evaporated without the addition of suitable neutral salts, a residue is obtained only a small part of which goes into solution and which even after subsequent treatment with neutral salts does not become more soluble.

Example: 100 grams of sulpho-salicylic acid (for example

$$COOH:OH:SO_3H-1:2:5)$$

are dissolved in one litre of water and heated on a water bath with 50 grams of freshly precipitated mercury oxide. As the molecular weights of sulpho-salicylic acid and mercury oxide are 218.1 and 216.6 respectively, they might for the purpose of practice be regarded as equal. Consequently in this case the excess of the former over the latter amounts to about 100%, whether expressed by the molecular weight or by grams. The mercury compound produced is freed from the unaltered sulphosalicylic acid in any suitable manner for instance by washing with alcohol, is dissolved in hot water, and accurately neutralized with an alkali using an indicator (of the sensitiveness of methyl orange in respect of hydrogen ion concentration). A solution is thus obtained which on cooling will set to a thick jelly-like mass. This latter can be transformed into a clear yellow solution, which even remains clear on further concentration, by the addition of small amounts of neutral salts, for example of 2 grams ammonium chloride. The same result may be obtained if 100 parts of the mercury compound separated from the unchanged sulpho-salicylic acid are treated, prior to neutralization, that is to say as free acid, with about 1.3 parts of solid ammonium chloride, and only afterwards neutralized and concentrated, or if the neutral salt is added only during evaporation.

It has been found advantageous to use physiological sodium chloride solution or physiological salt mixtures as the dissolvation medium because this is of value for the therapeutical use of the preparation. If, for example a sodium chloride solution is taken, of a physiological concentration of 0.7%, 2 cc. of a neutralized mercury sulphosalicylic acid gel is caused to undergo dissolvation by 1.1 cc. of this solution.

Experiments on animals and clinical experiences have shown that the solutions of mercury derivatives of the hydroxy-sulphobenzoic acids obtained according to the present process are considerably less toxic, than the known salts of the mercurified hydroxy-sulpho-benzoic acids. They offer the additional advantage that they do not give rise to any irritation or other secondary effects, and that they can be used for injections without addition of anæsthetizing media because they cause no pains. The fact that they contain considerably more mercury than the known compounds has already been mentioned.

I use the term "mercury derivatives of hydroxy-sulpho-benzoic acids," to include not only the mercury derivatives of these acids themselves, but also of their homologues.

I wish it to be understood that I do not desire to be limited to the exact details as described herein before, as obvious modifications will occur to a person skilled in the art.

I claim:

1. The process for the production of solutions of mercury derivatives of the hydroxy-sulpho-benzoic acids suitable for use in therapeutics, which consists in effecting the mercurification of the said acids in the presence of an excess over equimolecular proportions of the respective hydroxy-sulpho-benzoic acids, neutralizing the mercurified acids and causing the neutral salts of the said acids to undergo dissolvation, i. e. bringing the same into molecularly dispersed solution without separating the said salts by evaporation, by the addition of water soluble neutral salts with the exception of sulphates, nitrates and chlorates.

2. Process for the production of solutions of mercury derivatives of the hydroxy-sulpho-benzoic acids suitable for use in therapeutics, which consists in effecting the mercurification of the said acids in the presence of an excess over equimolecular proportions of the respective hydroxy-sulpho-benzoic acids, neutralizing the mercurified acids causing the solution to set to a gel on cooling and transforming the neutral salts of the mercury hydroxy-sulpho-benzoic acids into truly soluble complex salts by the addition of water soluble neutral salts with the exception of sulphates, nitrates and chlorates.

3. The process for the production of molecularly dispersed solutions of mercury derivatives of the hydroxy-sulpho-benzoic acids, which consists in effecting the mercurification of the said acids in watery solution in the presence of an excess over equimolecular proportions of the respective hydroxy-sulpho-benzoic acids, freeing the mercury compound thus produced from the unaltered hydroxy-sulpho-benzoic acids, dissolving the acid and accurately neutralizing the solution, allowing the neutralized solution to set to a gel on cooling and transforming the gel into a clear solution by the addition of water soluble neutral salts, with the exception of sulphates, nitrates and chlorates.

4. The process for the production of molecularly dispersed solutions of mercury derivatives of the hydroxy-sulpho-benzoic acids, which consists in effecting the mercurification of the said acids in watery solution in the presence of an excess over equimolecular proportions of the respective hydroxy-sulpho-benzoic acids, freeing the mercury compound thus produced from the unaltered hydroxy-sulpho-benzoic acids by washing with alcohol, dissolving the mercury compound again in hot water, accurately neutralizing the solution, allowing the neutralized solution to set to a gel on cooling and transforming the gel into a clear solution by the addition of water soluble neutral salts, with the exception of sulphates, nitrates and chlorates.

5. The process for the production of molecularly dispersed solutions of mercury derivatives of the hydroxy-sulpho-benzoic acids, which consists in effecting the mercurification of the said acids in watery solution in the presence of an excess over equimolecular proportions of the respective hydroxy-sulpho-benzoic acids, freeing the mercury compound thus produced from the unaltered hydroxy-sulpho-benzoic acids by washing with alcohol, dissolving the mercury compound again in hot water, accurately neutralizing the solution with an alkali thereby using an indicator of the sensitiveness of methyl orange in respect of hydrogen ion concentration, allowing the neutralized solution to set to a gel on cooling and transforming the gel into a clear solution by the addition of water soluble neutral salts, with the exception of sulphates, nitrates and chlorates.

6. The process for the production of a molecularly dispersed solution of a mercury sulpho-salicylic acid which consists in effecting the mercurification of the said acid in watery solution in the presence of an excess over equimolecular proportions of the acid, freeing the mercury compound thus produced from the unaltered sulpho-salicylic acid by washing with alcohol, dissolving the mercury compound again in hot water, accurately neutralizing the solution with an alkali thereby using an indicator of the sensitiveness of methyl orange in respect of hydrogen ion concentration, allowing the neutralized solution to set to a gel on cooling and transforming the gel into a clear solution by the addition of water soluble neutral salts, with the exception of sulphates, nitrates and chlorates.

7. The process for the production of a molecularly dispersed solution of a mercury sulpho-salicylic acid which consists in effecting the mercurification of the said acid in watery solution in the presence of an excess over equimolecular proportions of the acid, freeing the mercury compound thus produced from the unaltered sulpho-salicylic acid by washing with alcohol, dissolving the mercury compound again in hot water, accurately neutralizing the solution with an alkali thereby using an indicator of the sensitiveness of methyl orange in respect of hydrogen ion concentration, allowing the neutralized solution to set to a gel on cooling, transforming the gel into a clear solution by the addition of water soluble neutral salts, excepting sulphates, nitrates and chlorates, and thereupon concentrating the said solution.

8. The process for the production of a molecularly dispersed solution of a mercury sulpho-salicylic acid which consists in mixing a watery solution of 100 parts by weight of sulpho-salicylic acid $$(COOH:OH:SO_3H-1:2:5)$$

with 50 parts by weight of freshly precipitated mercury oxide, heating the mixture, freeing the mercury compound thus produced from the unaltered sulpho-salicylic acid by washing with alcohol, dissolving the mercury compound again in hot water, accurately neutralizing the solution with an alkali thereby using as indicator methyl orange allowing the neutralized solutions to set to a gel on cooling and transforming the gel into a clear solution by addition of physiological salt mixtures which are neutral, water soluble and not decomposing the mercury compounds.

9. The process for the production of a molecularly dispersed solution of a mercury sulpho-salicylic acid which consists in mixing a watery solution of 100 parts by weight of sulpho-salicylic acid $$(COOH:OH:SO_3H-1:2:5)$$

with 50 parts by weight of freshly precipitated mercury oxide, heating the mixture, freeing the mercury compound thus produced from the unaltered sulpho-salicylic acid by washing with alcohol, dissolving the mercury compound again in hot water, accurately neutralizing the solution with an alkali thereby using as indicator methyl orange, allowing the neutralized solution to set to a gel on cooling, transforming the gel into a clear solution by addition of physiological salt mixtures which, while being neutral, and water soluble, do not decompose the mercury compound and thereupon concentrating the said solution.

10. Solutions of mercury derivatives of the hydroxy-sulpho-benzoic acids suitable for use in therapeutics containing neutral salts of such mercury hydroxy-sulpho-benzoic acids which have been mercurified in the presence of an excess of the respective hydroxy-sulpho-benzoic acids, the said salts being brought into molecularly dispersed solutions by additions of water soluble neutral salts, except sulphates, nitrates and chlorates.

11. Molecularly dispersed solutions of mercury derivatives of sulpho-salicylic acid suitable for use in therapeutics containing truly soluble complex salts of mercury sulpho-salicylic acids with neutral salts.

12. Molecularly dispersed solutions of mercury derivatives of sulpho-salicylic acid suitable for use in therapeutics containing truly soluble complex salts of the sulpho-salicylic acid:

$$COOH:OH:SO_3H-1:2:5$$

with neutral salts.

13. Molecularly dispersed solutions of mercury derivatives of sulpho-salicylic acid suitable for use in therapeutics containing truly soluble complex salts of the sulpho-salicylic acid:

$$COOH:OH:SO_3H-1:2:5$$

with sodium chloride.

In testimony whereof I have affixed my signature.

EUGEN SAGI.